(12) United States Patent
Takai et al.

(10) Patent No.: US 7,149,338 B2
(45) Date of Patent: Dec. 12, 2006

(54) NEXT PROCESS-DETERMINING METHOD, INSPECTING METHOD AND INSPECTING APPARATUS

(75) Inventors: Mitsuru Takai, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 831 days.

(21) Appl. No.: 10/084,177

(22) Filed: Feb. 28, 2002

(65) Prior Publication Data
US 2003/0002728 A1  Jan. 2, 2003

(30) Foreign Application Priority Data
Mar. 2, 2001  (JP) .............................. 2001-057584

(51) Int. Cl.
*G06K 9/00*  (2006.01)
(52) U.S. Cl. ...................................... 382/141; 382/144
(58) Field of Classification Search ......... 382/141–152
See application file for complete search history.

(56) References Cited

U.S. PATENT DOCUMENTS

| | | | | |
|---|---|---|---|---|
| 4,758,782 A | * | 7/1988 | Kobayashi | 382/148 |
| 5,184,229 A | * | 2/1993 | Saito et al. | 382/239 |
| 5,289,549 A | * | 2/1994 | Rattey et al. | 382/238 |
| 5,471,239 A | * | 11/1995 | Hill et al. | 348/155 |
| 5,831,677 A | * | 11/1998 | Streater | 375/240.12 |
| 5,872,864 A | * | 2/1999 | Imade et al. | 382/176 |
| 6,169,282 B1 | * | 1/2001 | Maeda et al. | 250/310 |
| 6,868,175 B1 | * | 3/2005 | Yamamoto et al. | 382/145 |
| 2003/0095686 A1 | * | 5/2003 | Montgomery | 382/103 |

FOREIGN PATENT DOCUMENTS

| | | |
|---|---|---|
| JP | 11242746 | 9/1999 |
| JP | 2000251069 | 9/2000 |

\* cited by examiner

*Primary Examiner*—Joseph Mancuso
*Assistant Examiner*—Hadi Akhavannik
(74) *Attorney, Agent, or Firm*—Greenblum & Bernstein, P.L.C.

(57) ABSTRACT

There are provided a next process-determining method capable of determining a next process to be carried out next objectively and at the same time in a short time period, as well as an inspecting method and apparatus which are capable of carrying out a predetermined inspection as to an object to be inspected according to the next process-determining method. A sample object is digitized to sample data formed by digital data. The sample data is compressed into compressed sample data according to a predetermined data format. There is calculated a difference data amount between a data amount of the compressed sample data and a data amount of reference data formed by digitizing and compressing a reference sample object in the same manner as the sample object is processed. Which of a plurality of predetermined numerical ranges the difference data amount belongs to is identified. A predetermined process is determined which is associated with the identified numerical range in advance as a next process to be carried out next.

10 Claims, 3 Drawing Sheets

NEXT PROCESS-DETERMINING METHOD, INSPECTING METHOD AND INSPECTING APPARATUS

BACKGROUND OF THE INVENTION

1. Field of the Invention

This invention relates to a next process-determining method for determining a next process to be carried out next time based on sample data obtained by digitizing a sample object, an inspecting method for determining a next process based on image data obtained by picking up an image of an object to be inspected and carrying out the next process, and an inspecting apparatus for executing a predetermined process according to the inspecting method.

2. Description of the Related Art

For instance, to inspect whether or not a micro defect exists on the surface of a magnetic material layer (magnetic metal thin film) of a magnetic tape for recording various data, first, the surface of the magnetic material layer is magnified by hundreds of times by using an optical microscope and photographed in this state. Next, an operator visually checks based on the image of the photograph whether or not the surface has a flaw, a crack, a projection, or a depression, whether or not a deposition is formed thereon, and whether or not a foreign matter is attached thereto. After that, the quality of the magnetic tape is determined depending on the subjective judgment of the operator.

In an image defect detecting method (inspecting method) disclosed in Japanese Laid-Open Patent Publication (Kokai) No. 11-242746, two types of data conversion processes opposite to each other are carried out on digital images taken of an object to be inspected, and a difference value between two image data items formed by the data conversion processes is calculated to thereby determine whether or not a defective portion exists. More specifically, first, a digital image of the object to be inspected is duplicated to produce two image data items. One of the image data items is subjected to dilate filter processing and then to erode filter processing, while the other of the image data items is subjected to the erode filter processing and then to the dilate filter processing. In this case, in the dilate filter processing, pixel data of colors near white (light colors) in the image data items are increased, whereas in the erode filter processing, pixel data of colors near black (dark colors) in the image data items are increased. As a result, in the one of the image data items, a defective portion whose image was picked up with pixels near white in color is emphasized, whereas in the other image data item, the defective portion whose image was picked up with pixels near black in color is emphasized. Next, a difference value between the one and the other of the image data items is calculated. Then, by comparing the difference value and a reference value (threshold) with each other, it is determined whether or not the digital image before the data conversion processes contained an image taken of the defective portion.

Further, in the wiring pattern checking method disclosed in Japanese Laid-Open Patent Publication (Kokai) No. 2000-251069, image data obtained by picking up an image of a wiring pattern on a printed circuit board is binarized by a predetermined processing method, and then the dilate filter processing and the erode filter processing are carried out on the binarized image data, whereby a disconnection of a trace in a wiring pattern or a short circuit between traces in the wiring pattern is detected. In this case, an image of an ultra-fine short-circuited portion, which was shown as a broken line in the unprocessed image data, is converted to an image of a linear unbroken line thicker than it actually is, in the binarized image data which has been subjected to the dilate filter processing. Further, an image of a half-disconnected portion, which was shown in the unprocessed image data as if it were connected, is converted to an image of a clearly disconnected portion, in the binarized image data which has been subjected to the erode filter processing. This enables a continuity-determining process to be executed so as to judge whether or not pixels X11, X12 corresponding to base points X1, X2, respectively, are connected by pixels identical in value of pixel data. Here, the base points X1, X1 are points at respective ends of an arbitrary trace in the wiring pattern, which should be connected to each other. If the pixels X11, X12 are not connected to each other, it can be determined that a disconnection exists in the trace between the base points X1, X1 in the wiring pattern. Further, the continuity-determining process may be executed as to connection between pixels Y11, Y12 corresponding to base points Y1, Y2 in respective traces, which should be insulated from each other. If the pixels Y11, Y12 are connected to each other, it can be determined that a short circuit exists between the traces in the wiring pattern to which the base points Y1, Y2 belong, respectively.

However, the above inspecting methods suffer from the following problems: The inspecting method of checking whether or not a micro defect exists in a photograph of the surface of an object to be inspected necessitates the operator's counting of defective portions formed on the surface by visual checking thereof, which results in a very low inspecting efficiency. Further, this inspecting method determines whether or not the object is a conforming item based on the count of defective portions, which depends on the subjectivity of the operator. Therefore, the criterion of the determination is different between operators, which makes it difficult to keep constant the quality level of inspected objects determined to be conforming items.

In the inspecting method disclosed in Japanese Laid-Open Patent Publication (Kokai) No. 11-242746, two image data items are formed by picking up and duplicating an image of an object to be inspected, and subjected to the two types of data conversion processes opposite to each other, such that defective portions in both of the image data items can be emphasized, and then a difference value between the image data items is calculated and compared with a reference value (threshold), whereby the presence or absence of a defect is determined. Therefore, differently from the determining method dependent on the subjectivity of the operator, it is possible to determine the presence of a defect objectively. However, to carry out accurate determination by comparing the difference value and the reference value (threshold) with each other, it is necessary to increase the difference between image data containing an image of a defective portion and image data containing no image of a defective portion. Therefore, it is necessary to further emphasize the defective portion without degrading the image represented by the image data, when the filter processing is carried out on the image data. To meet the requirement, it is required to reduce the amount of conversion in each operation of the dilate filter processing and the erode filter processing, and repeat these operations a plurality of times. As a result, in this conventional inspecting method, it takes a very long processing time to determine whether the inspected object is a conforming item.

Further, in the inspecting method proposed by Japanese Laid-Open Patent Publication (Kokai) No. 2000-251069, the continuity-determining process is executed to determine whether or not processed image data has a sequence of continuous pixels identical in value of image data, for detecting a short circuit and a disconnection. However, although this inspecting method can determine continuity of pixels, it is difficult for this method to detect whether or not micro defects exist on the surface of the magnetic material layer of a magnetic tape. On the other hand, if the binarized image data having been subjected to the dilate filter processing and the binarized image data having been subjected to the erode filter processing are displayed on a display section, respectively, the operator can visually determine the presence or absence of a defect on the surface of the magnetic material layer. In such an inspecting method, however, similarly to the conventional inspecting method for checking whether or not a photograph taken of an object to be inspected contains an image of a micro defect, whether or not the object is a conforming item is determined in a manner dependent on the subjectivity of the operator. Therefore, the criterion of the determination is different between operators, which makes it difficult to keep constant the quality level of inspected objects determined to be conforming items.

SUMMARY OF THE INVENTION

It is a first object of the invention to provide a next process-determining method which is capable of determining a next process to be carried out next objectively and at the same time in a short time period. Further, it is a second object of the invention to provide an inspecting method and an inspecting apparatus which are capable of carrying out a predetermined inspection as to an object to be inspected according to the above next process-determining method.

To attain the first object, the present invention provides a next process-determining method comprising the steps of digitizing a sample object into sample data formed by digital data, compressing the sample data into compressed sample data according to a predetermined data format, calculating a difference data amount between a data amount of the compressed sample data and a data amount of reference data formed by digitizing and compressing a reference sample object in the same manner as the sample object is processed, identifying which of a plurality of predetermined numerical ranges the difference data amount belongs to, and determining a predetermined process associated with the identified numerical range in advance as a next process to be carried out next. It should be noted that the sample data in the present invention includes digital data, such as image data and sound data. Further, the image data includes both still image data and moving image data.

The next process-determining method according to the invention identifies which of a plurality of numerical ranges associated in advance with respective predetermined processes the difference data amount between the data amount of sample data compressed according to a predetermined data format and the data amount of reference data belongs to, and determines a predetermined process associated with the identified numerical range as the next process to be carried out next. Therefore, differently from the conventional method of determining the next process by the subjective judgment of an operator, it is possible to determine the next process objectively and at the same time in a short time period.

In this case, it is preferred that the sample data is compressed into the compressed sample data according to the predetermined data format by using a data-compressing method therefor which is capable of compressing an amount of data at a higher rate as digital data of an identical kind occurs more continuously, or as the digital data has a higher regularity.

According to this preferred embodiment, the sample data is compressed according to the predetermined data format by using the data-compressing method therefor which is capable of compressing an amount of data at a higher rate as digital data of an identical kind occurs more continuously or as the digital data has a higher regularity. Therefore, the amount of change in the sample object can be accurately reflected on a change in the data amount of the sample data.

Further, it is preferred that the sample data is formed by image data obtained by picking up an image of the sample object, the digital data being composed of data of pixels formed in picking up the image of the sample object.

According to this preferred embodiment, the sample data is formed by image data obtained by picking up an image of the sample object, and the digital data forming the sample data is composed of pixel data formed in picking up the image of the sample object. Therefore, the difference data amount is changed according to a change in the picked-up image of the object. This enables the next process to be determined by using the change in the difference data amount as a trigger.

It is preferred that the reference sample object is changed with a lapse of time.

Further, it is preferred that the compressed sample data which is formed based on an image of the sample object picked up on an immediately preceding occasion is sequentially changed to the reference data.

According to these preferred embodiments, the reference sample object is changed with a lapse of time, whereby even if the reference sample object is dynamically changed, it is possible to determine the next process promptly and properly based on the reference data formed by digitizing and compressing the reference sample object which is changed with a lapse of time.

To attain the second object, the present invention provides an inspecting method that picks up an image of an object to be inspected, digitizes the picked-up image to image data formed of pixel data, and determines a next process based on the image data to execute the next process, the inspecting method comprising the steps of compressing the image data into compressed image data according to a predetermined data format in which an amount of data can be compressed at a higher rate as the pixel data of an identical kind occurs more continuously, or as the pixel data has a higher regularity, calculating a difference data amount between a data amount of the compressed image data and a data amount of reference data formed by digitizing and compressing a reference picked-up image in the same manner as the image of the object to be inspected is processed, identifying which of a plurality of predetermined numerical ranges the difference data amount belongs to, and determining a predetermined process associated with the identified numerical range in advance as a next process to be carried out next, and then carrying out the predetermined process.

It should be noted that the inspecting method is preferably carried out such that when a reference inspection surface of the object to be inspected is defined as the reference picked-up image in advance, and a numerical range for conforming items and a numerical range for nonconforming items are set in advance as the plurality of numerical ranges, and that when the numerical range to which the calculated difference data amount belongs is identified as the numerical range for conforming items, a conforming item-determining process is carried out as the predetermined process, whereas when the numerical range to which the calculated difference data amount belongs is identified as the numerical range for nonconforming items, a nonconforming item-determining process is carried out as the predetermined process.

According to this preferred embodiment, there is determined to which of the plurality of numerical ranges associated with the predetermined processes, respectively, belongs the difference data amount between the data amount of image data compressed according to the predetermined data format and the data amount of reference data formed based on the reference picked-up image, and a predetermined process associated with the identified numerical range is carried out next. This makes it possible to judge whether the inspected object is a conforming item or a nonconforming item, and carry out a predetermine process suitable for the result of the judgment objectively and promptly.

In this case, it is preferred that an image of the reference inspection surface is picked up by optically magnifying the same at a predetermined magnification to thereby form the reference data in advance, while the inspection surface of the object to be inspected is picked up by optically magnifying the same at the predetermined magnification to thereby digitize the image data.

According to this preferred embodiment, the image of the reference inspection surface is picked up by optically magnifying the same at the predetermined magnification to thereby form reference data and image data. This makes it possible to inspect the presence or absence of a micro defect with higher accuracy and in a shorter time period in comparison with the inspecting method which uses image data picked up in an unmagnified size or image data enlarged through digital processing.

Furthermore, the inspecting method according to the invention can be applied to a case in which a non-magnetic substrate in the form of a continuous film, or a metal thin film-type magnetic tape having a non-magnetic substrate coated with a metal thin film is inspected for the presence of a micro defect on the surface of the tape.

In this case, the non-magnetic substrate in the form of a continuous film, or the metal thin film-type magnetic tape having the non-magnetic substrate coated with a metal thin film is inspected for the presence of a micro defect on the surface of the tape, and therefore, for instance, in comparison with the conventional method which visually checks whether or not a micro defect occurs on the surface of a magnetic tape, based on a photograph of the surface of the tape, it is possible to inspect the quality of the metal thin film-type magnetic tape or the like objectively, in a shorter time period, and more easily.

Further, the inspecting method according to the invention can also be applied to a case in which the non-magnetic substrate in the form of a continuous film is inspected for detecting whether or not micro asperities within a defined range of roughness are formed on a back surface thereof.

In this case, the non-magnetic substrate in the form of a continuous film is inspected for detecting whether or micro asperities within a defined range of roughness are formed on the back surface thereof, and therefore, it is possible to reliably, quickly and easily inspect the degree of surface roughness of the non-magnetic substrate which is difficult to visually inspect.

To attain the second object, the present invention provides an inspecting apparatus comprising a data-processing section for compressing image data which is obtained by picking up an image of an object to be inspected and digitizing the picked-up image, according to a predetermined data format in which an amount of data can be compressed at a higher rate as pixel data of an identical kind occurs more continuously in the image data or as the pixel data in the image data has a higher regularity, a storage section for storing a plurality of numerical ranges which are associated in advance with predetermined processes, respectively, and a data amount of reference data formed by digitizing and compressing a reference picked-up image in the same manner as the image of the object to be inspected is processed, a calculating section for calculating a difference data amount between a data amount of the image data compressed by the data-processing section and the data amount of the reference data stored in the storage section, and a control section for identifying which of the plurality of numerical ranges stored in the storage section the difference data amount calculated by the calculating section belongs to, and carrying out the predetermined process associated with the identified numerical range as a next process to be carried out next.

The inspecting apparatus according to the invention includes the control section for identifying which of the numerical ranges stored in the storage section the difference data amount calculated by the calculating section belongs to, and hence it is possible to determine the presence or absence of a defect and the degree of the defect, as to the object to be inspected. Further, the predetermined process associated with the identified numerical range is carried out as the next process to be carried out next. This makes a process suitable for the result of the determination to be executed reliably and promptly.

It should be noted that the disclosure of the present specification relates to the subjects included in Japanese Patent Application No. 2001-57584 which was filed with Japanese Patent Office on Mar. 2, 2001, and all of the disclosures thereby are expressly incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The invention will now be described in detail with reference to the drawings useful in describing a next process-determining method, an inspecting method and an inspecting apparatus according to a preferred embodiment of the invention.

Figure 1:
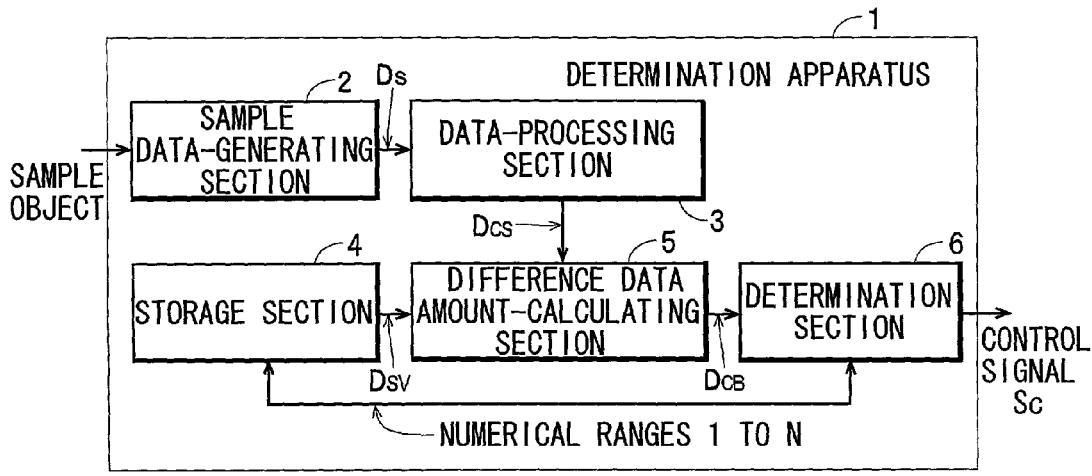
FIG. 1 is a block diagram showing the construction of a determination apparatus according to an embodiment of the invention.

First of all, a determination apparatus 1 for carrying out a predetermined determination process according to the next process-determining method of the invention will be described with reference to FIGS. 1 and 2.

The determination apparatus 1 determines the next process from 1 to N candidate processes, where N is a natural number equal to or larger than 2, by performing a next process-determining process, described hereinafter, on a sample object that can be converted to a numerical form or digitized. As shown in FIG. 1, the determination apparatus 1 is comprised of a sample data-generating section 2, a data-processing section 3, a storage section 4, a difference data amount-calculating section 5, and a determination section 6. In this embodiment, sample objects include objects whose images can be picked up as digital still image data and digital moving image data as well as sounds which can be recorded as digital sound data.

The sample data-generating section 2 is implemented, for instance, by a digital camera, and digitizes a sample object to generate sample data Ds formed by digital data. The data-processing section 3 compresses the sample data Ds output from the sample data-generating section 2 to generate compressed sample data $D_{CS}$, according to a predetermined data compression format in which the amount of data can be compressed at a higher rate as digital data of the same kind occurs more continuously or as digital data has a higher regularity. As the data format of compressed sample data $D_{CS}$, there may be employed data compression formats, such as the LZH format and the ZIP format, the JPEG (Joint Photographic Experts Group) format and the GIF (Graphics Interchange Format) format for digital still image data, the MPEG-2 (Motion Picture Experts Group version 2) format and the AVI (Audio Video Interleaved) format for digital moving image data, as well as the MP3 format and the ADPCM (Adaptive Differential Pulse Code Modulation) format for digital sound data. It should be noted that these data formats are data compression formats in which the amount of data can be compressed at a higher rate as digital data of the same kind occurs more continuously or as the digital data has a higher regularity, and description of data compression algorithms of the above formats is omitted since they are generally known.

The storage section 4 stores, as a reference data amount $D_{SV}$, the data amount of reference data formed by compressing sample data of a reference sample object to be compared with a sample object that can be digitized, in advance according to the predetermined data compression format. Further, the storage section 4 stores numerical ranges 1 to N associated with next processes 1 to N, respectively. The difference data amount-calculating section 5 calculates a difference data amount $D_{CB}$ between the data amount of the compressed sample data $D_{CS}$ obtained by compressing the sample data Ds by the data-processing section 3 and the reference data amount $D_{SV}$ read out from the storage section 4. The determination section 6 determines to which of the ranges 1 to N associated with the respective next processes 1 to N belongs the difference data amount $D_{CB}$, and outputs a control signal Sc specifying one of the next processes 1 to N corresponding to the result of the determination.

Figure 2:
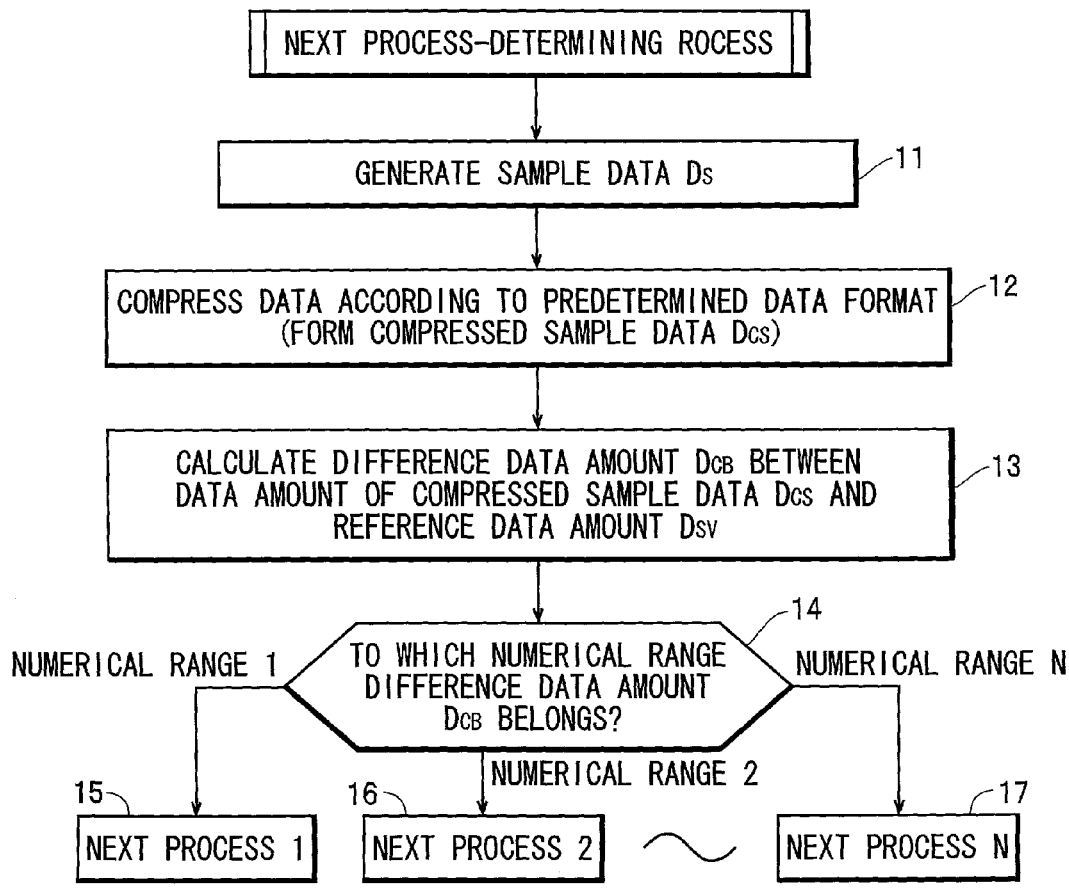
FIG. 2 is a flowchart showing a next process-determining process executed by the determination apparatus.

In the above next process-determining process carried out by the determination apparatus 1, as shown in FIG. 2, the sample data-generating section 2 generates sample data Ds of a sample object to output the same to the data-processing section 3 in a step S11. Then, the data-processing section 3 compresses the sample data Ds according to the predetermined data format, thereby producing compressed sample data $D_{CS}$ to output the same to the difference data amount-calculating section 5 in a step S12. Next, the difference data amount-calculating section 5 calculates the difference data amount $D_{CB}$ based on the data amount of the compressed sample data $D_{CS}$ input from the data-processing section 3 and the reference data amount $D_{SV}$ read out from the storage section 4, to output the difference data amount $D_{CB}$ to the determination section 6 in a step S13. After that, the determination section 6 determines in a step S14, to which of the ranges 1 to N read out from the storage section 4 belongs the difference data amount $D_{CB}$, and outputs the control signal Sc produced according to the result of the determination to an external apparatus, not shown. This enables the external apparatus to perform one of various processes (one of the next processes 1 to N) in response to the input control signal Sc in one of steps S15 to S17.

As described above, according to the determination apparatus 1, the difference data amount $D_{CB}$ between the data amount of compressed sample data $D_{CS}$ generated based on a sample object and the reference data amount $D_{SV}$ of reference data generated based on a reference sample object is calculated, and it is judged to which of the ranges 1 to N belongs the difference data amount $D_{CB}$. Then, the control signal Sc produced according to the result of the determination is output. Thus, differently from a method of determining the next process in a manner dependent on the subjective judgement of the operator, it is possible to determine the next process objectively based on the sample object. More specifically, for instance, when a sample object in a state in which it remains unchanged is defined as the reference sample object (e.g. an image of an unmanned room), if an actual sample object (actual image of the room) is changed from the reference sample object, the continuity or regularity of pixel data in the sample data Ds is inevitably changed. Therefore, a difference between the amount of the compressed sample data $D_{CS}$ and the reference data amount $D_{SV}$ is necessarily produced. Therefore, if a next process to be executed, such as an alarm sound generation process, a notification process, or the like, is defined in advance, it is possible to determine the next process objectively and at the same time promptly.

Next, an embodiment of the next process-determining method according to the invention will be described by taking a surface-inspecting apparatus 21 for carrying out a predetermined inspection according to the inspecting method of the invention as an example.

Figure 3:
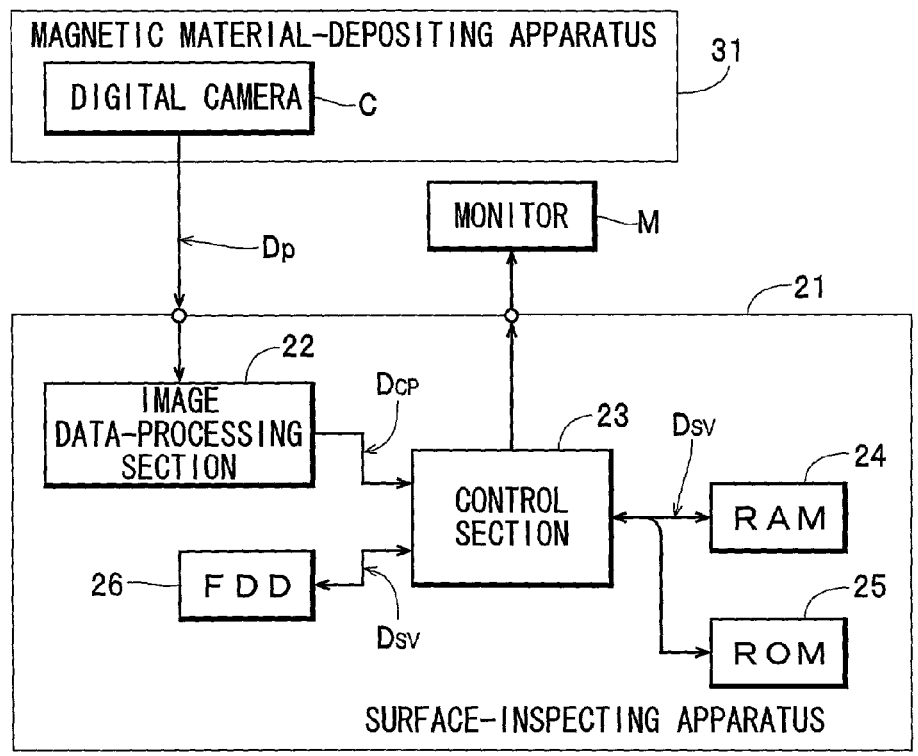
FIG. 3 is a block diagram showing the arrangement of a surface-inspecting apparatus and a magnetic material-depositing apparatus according to another embodiment of the invention.

The surface-inspecting apparatus 21 is used for inspecting whether or not a micro defect exists on the surface of the magnetic material layer of a magnetic tape T for recording various data. The surface-inspecting apparatus 21 receives image data $D_P$ of the surface of the magnetic tape T, picked up by a digital video camera C arranged in a magnetic material-depositing apparatus 31, and carries out a predetermined surface-inspecting process based on the image data $D_P$. As shown in FIG. 3, the surface-inspecting apparatus 21 is comprised of an image data-processing section 22, a control section 23, a RAM 24, a ROM 25 and an FDD 26, and is configured such that it can display the results of determination on a monitor M as an external apparatus. The image data-processing section 22 sequentially receives image data $D_P$ picked up by the digital video camera C, and compresses image data $D_P$ of each still image according to a predetermined compression algorithm, thereby sequentially forming compressed image data $D_{CP}$ to output the same to the control section 23.

The control section 23 connects compressed image data $D_{CP}$ of a plurality of still images, formed by the image data-processing section 22, to each other, thereby forming digital moving image data of the MPEG-2 format to display the same on the monitor M. Further, the control section 23 reads out a reference data amount $D_{SV}$ (data amount of compressed image data $D_{CP}$) which was stored on the immediately preceding occasion, from the RAM 24, and calculates the difference data amount $D_{CB}$ between the data amount of latest compressed image data $D_{CP}$ and the reference data amount $D_{SV}$ read out from the RAM 24. Further, the control section 23 causes the data amount of the latest compressed image data $D_{CP}$ to be stored in the RAM 24 as the updated reference data amount $D_{SV}$, and determines whether or not the calculated difference data amount $D_{CB}$ is within a tolerance range defined in advance.

The RAM 24 corresponds to the storage section of the present invention, and stores the data amount of compressed image data $D_{CP}$ output from the control section 23 as the reference data amount $D_{SV}$, and data of numerical ranges (data concerning the tolerance range) used as a reference for determination in the surface-inspecting process, described hereinafter. The ROM 25 stores the operating program of the control section 23. The FDD 26 is a drive device for driving, for instance, a 3.5 inch floppy disk, and configured such that it can read the reference data amount $D_{SV}$ (data amount of compressed image data $D_{CP}$) prepared in advance from the floppy disk, and write the data amount of compressed image data $D_{CP}$ formed by the surface-inspecting apparatus 21 into the floppy disk as the reference data amount $D_{SV}$.

Figure 4:
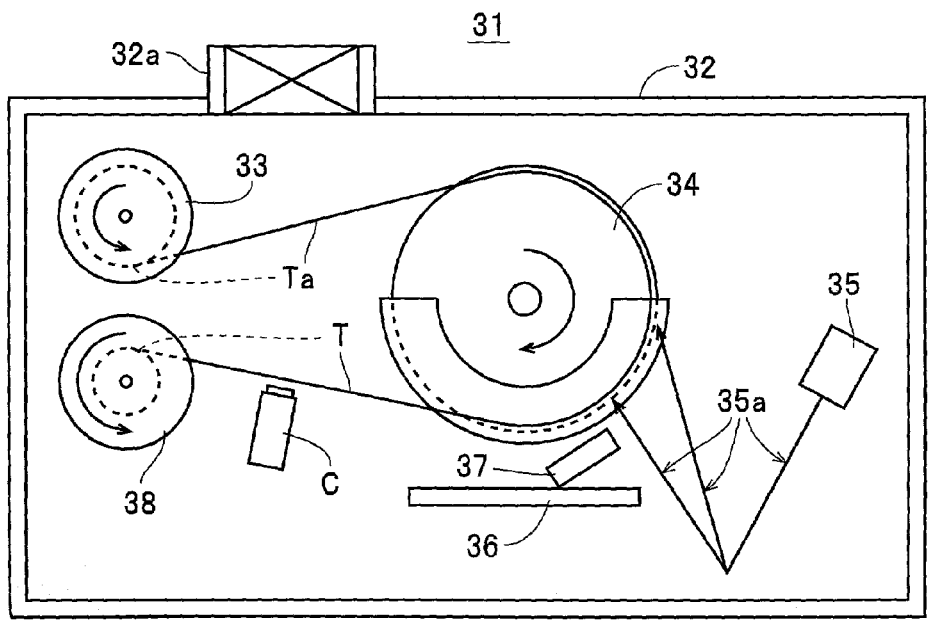
FIG. 4 is a block diagram showing the arrangement of the magnetic material-depositing apparatus that produces a magnetic tape which is an object to be inspected.

Referring to FIG. 4, there is shown the construction of the magnetic material-depositing apparatus 31 used for depositing a magnetic material (ferromagnetic metal) on the surface of a non-magnetic substrate Ta. The magnetic material-depositing apparatus 31 has a vacuum tank 32 of which the internal space is maintained in a vacuum state by a vacuum pump 32a. Arranged in the vacuum tank 32 are a supply reel 33, a cooling drum 34, an electron gun 35, a shutter 36, a gas supply nozzle 37, a take-up reel 38, and the digital video camera (CCD camera) C. It should be noted that the digital video camera (CCD camera) C may be arranged outside the vacuum tank 32.

The supply reel 33 has the non-magnetic substrate Ta wound therearound. The non-magnetic substrate Ta in the form of a continuous film is formed of PET (polyethylene terephthalate) and has a thickness of approximately 7μ. The cooling drum 34 carries the non-magnetic substrate Ta to a magnetic material-depositing position while cooling the non-magnetic substrate Ta to a predetermined temperature. The electron gun 35 irradiates an electron beam 35a onto the surface of ferromagnetic metal (e.g. Co) placed within a crucible, not shown, thereby depositing the ferromagnetic metal on the surface of the non-magnetic substrate Ta to form a ferromagnetic metal thin film (magnetic material layer) on the non-magnetic substrate Ta. The shutter 36 blocks the electron beam 35a at the initial stage and final stage of deposition of the ferromagnetic metal on the non-magnetic substrate Ta, thereby preventing undesired deposition of the ferromagnetic metal. The gas supply nozzle 37 supplies a gas having oxygen as a main component thereof to the surface of the non-magnetic substrate Ta to thereby stabilize the deposition of the ferromagnetic metal. The digital video camera C picks up an image of the surface of the non-magnetic substrate Ta (magnetic tape T) formed with the ferromagnetic metal thin film to generate image data $D_P$, and outputs the image data $D_P$ to the surface-inspecting apparatus 21. The digital video camera C includes an optical lens system for picking up an image of the surface of the magnetic tape T by enlarging the same at a predetermined magnification (e.g. by hundreds to thousands of times). Therefore, differently from image data photographed in an unmagnified size and image data magnified through digital processing, image data containing a location of occurrence of a micro defect can be picked up with high accuracy and at the same time in a short time period.

Figure 5:
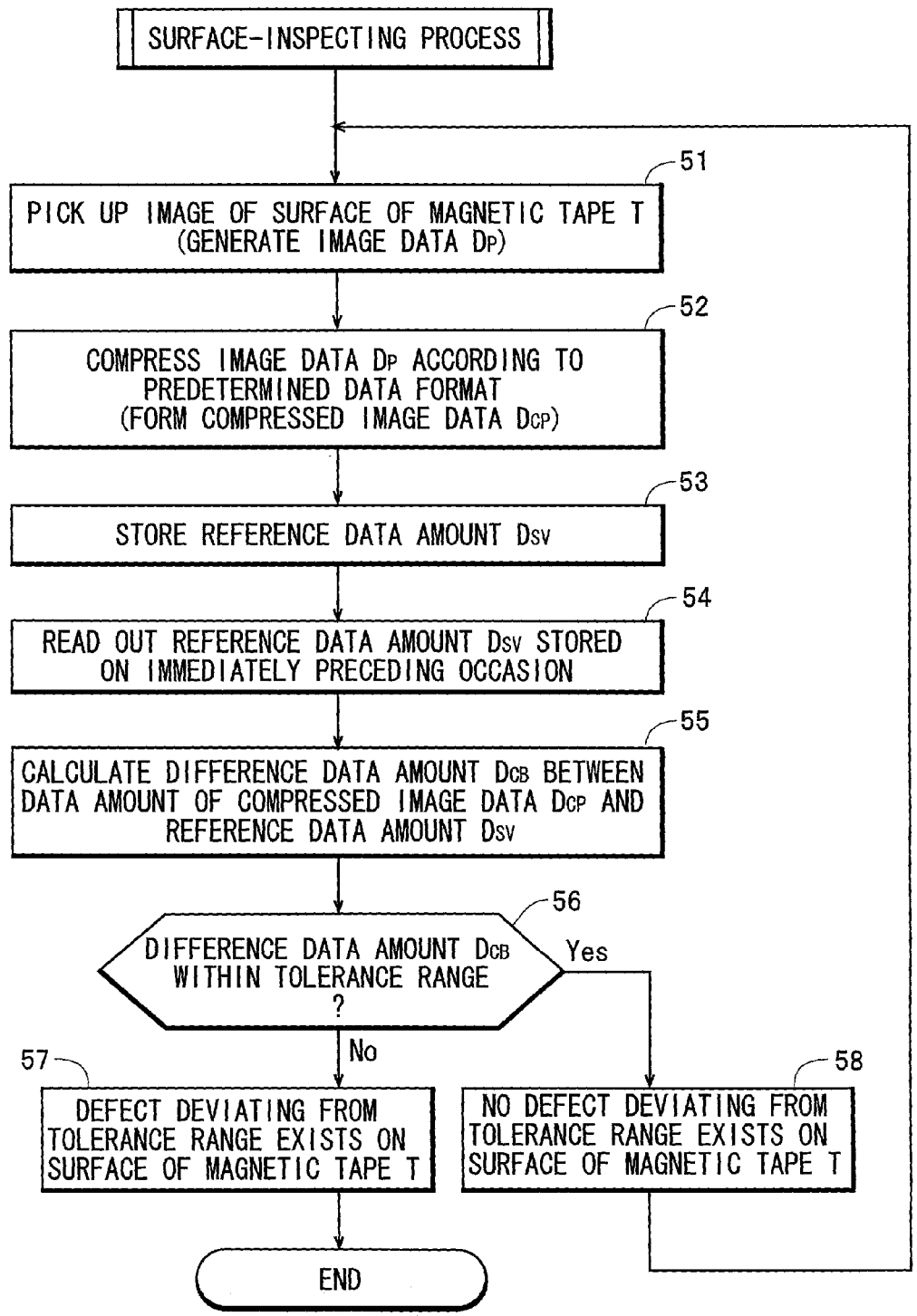
FIG. 5 is a flowchart showing a surface-inspecting process executed by the surface-inspecting apparatus.

Next, the surface inspecting method of inspecting the surface of the magnetic tape T, carried out by the surface-inspecting apparatus 21, will be described with reference to FIG. 5.

First, in a step S51, an image of the surface of the magnetic tape T is picked up by the digital video camera C arranged in the magnetic material-depositing apparatus 31 to generate image data $D_P$. Next, in a step S52, the image data-processing section 22 compresses the image data $D_P$ according to a predetermined compression algorithm (e.g. the MPEG-2 format), thereby forming compressed image data $D_{CP}$ to output the same to the control section 23. Then, the control section 23 stores the data amount of the input compressed image data $D_{CP}$ as a reference data amount $D_{SV}$ in the RAM 24 in a step S53, and reads out a reference data amount $D_{SV}$ which was stored on the immediately preceding occasion, from the RAM 24 in a step S54. After that, the control section 23 calculates, in a step S55, the difference data amount $D_{CB}$ between the data amount of latest compressed image data $D_{CP}$ (i.e. the above-mentioned data amount stored in the RAM 24) and the reference data amount $D_{SV}$ read out from the RAM 24, and determines in a step S56 whether or not the calculated difference data amount $D_{CB}$ is within a numerical range (i.e. within the tolerance range, e.g. a range within 30 kb) corresponding to data of the numerical range read out from the RAM 24.

In the above process, if a magnetic tape T produced by the magnetic material-depositing apparatus 31 has a flaw, a crack, a projection, a depression, or the like, if a deposition is formed therein, or if a foreign matter is attached thereto, image data $D_P$ obtained by picking up an image of the magnetic tape T is lowered in the continuity and regularity of pixel data of the same kind in comparison with image data $D_P$ obtained by picking up an image of a magnetic tape T with no defects formed thereon. Therefore, the data compression rate at which is formed the latest compressed image data $D_{CP}$ obtained by compressing the image data $D_P$ is reduced, and hence the compressed image data $D_{CP}$ becomes larger in data amount than the reference data amount $D_{SV}$ (data amount of compressed sample data $D_{CS}$) of reference data formed by compressing image data $D_P$ containing no image of defective portions. Consequently, the difference data amount $D_{CB}$ as the amount of the difference between the reference data amount $D_{SV}$ and the data amount of the latest compressed sample data $D_{CS}$ is increased to deviate from the tolerance range. It should be noted that when the image data $D_P$ is compressed, the data compression rate is reduced as the image data $D_P$ contains an image of a larger number of defective portions, or as a defective portion an image of which is contained in the image data $D_P$ is larger in size. As a result, the tolerance range is set in advance such that no magnetic tape T is erroneously determined to be a nonconforming item due to a defect which is allowable from the product standard of the magnetic tape T.

If the control section 23 determines that the difference data amount $D_{CB}$ deviates from the tolerance range, it determines in a step S57 that a certain defect beyond the tolerance range exists on the surface of the magnetic tape T, and displays the result of the determination on the monitor M, followed by terminating the surface-inspecting process to stop the magnetic material-depositing apparatus 31. This makes it possible to inspect the quality of a magnetic tape at an upstream stage of the manufacturing process, whereby the manufacturing yield of the magnetic tape can be largely enhanced in comparison with the conventional magnetic tape-inspecting method in which the characteristics of a magnetic tape T are inspected by inspecting electromagnetic conversion characteristics or the like only after a final stage of fitting the magnetic tape T in a cassette is carried out. On the other hand, when it is determined that the difference data amount $D_{CB}$ is within the tolerance range, the control section 23 determines in a step S58 that no defect exists on the surface of the magnetic tape T, or that a defect, if any, is within the tolerance range. Then, the program returns to the step S51, wherein the surface-inspecting process is further continued. In the following steps of the surface-inspecting process, the data amount of compressed sample data $D_{CS}$ which is formed by compressing image data $D_P$ that is determined to have no defect deviating from the tolerance range by the surface-inspecting process performed on the immediately preceding occasion is employed as the reference data amount $D_{SV}$.

As described hereinabove, according to the surface-inspecting apparatus 21, compressed sample data $D_{CS}$ is formed by compressing image data $D_P$ obtained by picking up an image of the surface of the magnetic tape T, and when the difference data amount $D_{CB}$ between the data amount of the compressed sample data $D_{CS}$ and the data amount (reference data amount) of compressed sample data $D_{CS}$ formed on the immediately preceding occasion deviates from the tolerance range, it is determined that a defect which deviates from the tolerance range exists on the magnetic tape T. This makes it possible to more objectively determine the quality of the magnetic tape T, in comparison with the conventional inspecting method of visually checking whether or not a micro defect exists on the surface of an inspected object, based on a photograph of the surface of the object. Further, according to the surface-inspecting apparatus 21, it is possible to obtain the data amount of compressed sample data $D_{CS}$ (of an object) to be compared with the reference data amount $D_{SV}$ simply by carrying out one compression operation on the image data $D_P$. Hence, the inspecting time period can be largely shortened in comparison with the inspecting method disclosed in Japanese Laid-Open Patent Publication (Kokai) No. 11-242746.

Further, in the surface-inspecting apparatus 21, the quality of the magnetic tape T is determined based on whether or not the difference data amount $D_{CB}$ is within a defined range, so that it is possible to inspect not only the surface of the magnetic tape T but also the presence or absence of a disconnection of a wiring pattern or a short circuit in the same. In this case, compressed sample data $D_{CS}$ which is formed by compressing image data $D_P$ obtained by picking up an image of the surface of a conforming printed circuit board, and compressed sample data $D_{CS}$ which is formed by compressing image data $D_P$ obtained by picking up an image of a printed circuit board with a disconnection or a short circuit are different from each other in the continuity and regularity of pixel data (digital data), so that their data compression rates as well are different from each other. Therefore, by using the data amount of the compressed sample data $D_{CS}$ formed based on the image taken up of the conforming printed circuit board as the reference data amount $D_{SV}$, calculating the difference data amount $D_{CB}$ between the reference data amount $D_{SV}$ and the data amount of compressed sample data $D_{CS}$ formed based on a printed circuit board to be inspected, and determining whether or not the difference data amount $D_{CB}$ is within the tolerance range, it is possible to quickly and properly determine whether the printed circuit board to be inspected is a conforming item or not.

It should be noted that the present invention is not limited to the above embodiments, but the construction thereof can be modified as required. For instance, although in the surface-inspecting apparatus 21 according to the embodiment of the invention, description was given based on the example in which the data amount of compressed sample data $D_{CS}$ that is formed immediately before carrying out the determination process and stored in the RAM 24 is employed as the reference data amount $D_{SV}$, this is not limitative, but it is also possible to record beforehand the data amount of compressed sample data $D_{CS}$ which is formed in advance based on a conforming magnetic tape T, as the reference data amount $D_{SV}$ in a floppy disk via the FDD 26, read the reference data amount $D_{SV}$ from the FDD 24 for storage in the RAM 24 during the surface-inspecting process, and carry out the determination process by using the reference data amount $D_{SV}$. Further, the present invention is not limited to inspection of whether or not an object to be inspected has any defects on a surface thereof which should be smooth, but can be applied to inspection of whether or not a to-be-inspected object (e.g. the back surface of a magnetic tape T) which should be formed with micro asperities within the tolerance range is extremely smooth to an extent out of the tolerance range. In this case, the data amount of compressed sample data $D_{CS}$ which is formed based on the to-be-inspected object having too smooth a surface is smaller than the data amount of compressed sample data $D_{CS}$ which is formed based on a to-be-inspected object having a normally rough surface, and therefore occurrence of a defect can be reliably detected. Further, it is also possible to define multiple numerical ranges sequentially distinguished from each other according to degree of defectiveness in advance as well as define a plurality of next processes beforehand in a manner associated with the multiple numerical ranges, respectively. When the above construction is adopted, it is possible to flexibly define a process to be carried out next according to the degree of defectiveness. Furthermore, although in the surface-inspecting apparatus 21, description was given based on the example in which digital moving image data of the MPEG-2 format is employed, and the difference data amount $D_{CB}$ between the data amount of compressed sample data $D_{CS}$ MPEG-2 data and the reference data amount $D_{SV}$ is used for the surface-inspecting process, this is not limitative, but it is possible to employ data compression methods using various data formats.

Further, sample objects used in the present invention include various objects which can be converted into moving image data, still image data, or sound data. More specifically, the inspection to which the next process-determining method using digital still image data can be properly applied includes an inspection of smoothness of the surfaces of a magneto-optical disk or an optical disk which is performed after sputtering treatment during manufacturing of the disk, an inspection of a defect on the surface of a floppy disk and an inspection of smoothness of the surface thereof, both performed after a magnetic material layer is formed on the floppy disk during manufacturing of the floppy disk, an inspection of roughness of the surface of a read/write head for use in reading and writing of data from and in a magnetic medium, performed after plating the head, and an inspection of smoothness of the surface of the read/write head, performed after sputtering treatment. Further, the inspection to which the next process-determining method using digital moving image data can be suitably applied includes surface inspection of an object moving at a high speed. More specifically, in addition to the surface inspection of the magnetic tape T described in the above the embodiment, the surface inspection includes an inspection of the presence of a defect, such as a flaw or the like, which is performed after a diamond-like carbon (DLC) layer is formed on a base tape, an inspection of unevenness of coating on the magnetic tape, which is performed after a top coating layer or a back coating layer is formed thereon, an inspection of deposition of oligomers on the base tape, an inspection of smoothness of the surface of the magnetic tape, which is performed after the tape is coated with a magnetic material (after binder treatment). Further, the inspection (control operation) which is suitable for the determination process employing digital sound data includes an inspection of the presence of a crack on a cast product, which is carried out by an acoustic test through tapping of the cast product and a crime prevention system of a sound-detecting type.

Further, the next process-determining method according to the invention can be applied not only to inspection processes, such as the surface-inspecting process according to the present embodiment, but also widely to various uses, including e.g. a meteorological observation which is carried out by using digital moving image data or digital still image data obtained by photographing at a fixed location, and an astronomical observation for observing extinction of planets and birth of fixed stars. Further, it is possible to photograph a topography (sample object) of a location from the sky, calculate the difference data amount between the amount of data formed by compressing image data of the photograph and a reference data amount, i.e. the amount of data formed by compressing image data of a photograph of a topography of the same location taken from the sky in the past, and determine whether or not a new map-preparing process should be executed as a predetermined process.

What is claimed is:

1. A next process-determining method, comprising:
   digitizing a sample object into digital sample data;
   compressing the digital sample data into compressed digital sample data having a predetermined data format;
   calculating a difference value between a size of the compressed digital sample data and a size of reference data formed by digitizing and compressing a reference sample object in the same manner as the sample object is processed;
   identifying which of a plurality of predetermined numerical ranges the difference value corresponds to in order to determine whether a defect exists; and
   determining a predetermined process associated with the identified numerical range in advance as a next process to be carried out.

2. A next process-determining method according to claim 1, wherein the digital sample data is compressed into the compressed digital sample data having the predetermined data format by using a data-compressing method capable of compressing an amount of data at a higher rate as digital data of an identical kind occurs more continuously, or as the digital data has a higher regularity.

3. A next process-determining method according to claim 1, wherein the digital sample data comprises image data formed by a plurality of pixel data when imaging the sample object.

4. A next process-determining method according to claim 3, wherein the reference sample object is changed with a lapse of time.

5. A next process-determining method according to claim 3, wherein the compressed digital sample data formed based on an image of the sample object picked up on an immediately preceding occasion is sequentially changed to reference data.

6. An inspecting method that picks up an image of an object to be inspected, digitizes the picked-up image to image data formed of pixel data, and determines a next process based on the image data to execute the next process, comprising:
   compressing the image data into compressed image data according to a predetermined data format in which an amount of compression depends on an amount of similarity within the image data;
   calculating a difference value between a size of the compressed image data and a size of reference data formed by digitizing and compressing a reference picked-up image in the same manner as the image of the object to be inspected is processed;
   identifying which of a plurality of predetermined numerical ranges the difference value belongs to in order to determine whether a defect exists;
   determining a predetermined process associated with the identified numerical range in advance as a next process to be carried out; and
   carrying out the predetermined process.

7. An inspecting apparatus, comprising:
   a data processor that compresses image data obtained by picking up an image of an object to be inspected and digitizing the picked-up image, according to a predetermined data format in which an amount of compression depends on an amount of similarity within the image data;
   a storer that stores a plurality of numerical ranges associated in advance with predetermined processes, and a size of reference data formed by digitizing and compressing a reference picked-up image in the same manner as the image of the object to be inspected is processed;
   a calculator that calculates a difference value between a size of the image data compressed by said data processor and the size of the reference data stored in said storer; and
   a controller that identifies which of the plurality of numerical ranges stored in said storer the calculated difference value belongs to in order to determine whether a defect exists, and carries out a predetermined process associated with the identified numerical range as a next process to be carried out.

8. A next process-determining method according to claim 2, wherein the digital sample data comprises image data formed by a plurality of pixel data when imaging the sample object.

9. A next process-determining method according to claim 8, wherein the reference sample object is changed with a lapse of time.

10. A next process-determining method according to claim 9, wherein the compressed sample data which is formed based on an image of the sample object picked up on an immediately preceding occasion is sequentially changed to reference data.

* * * * *